June 23, 1925.
S. W. CADY
TRACTOR HARROW
Filed March 1, 1922
1,543,639
2 Sheets-Sheet 1
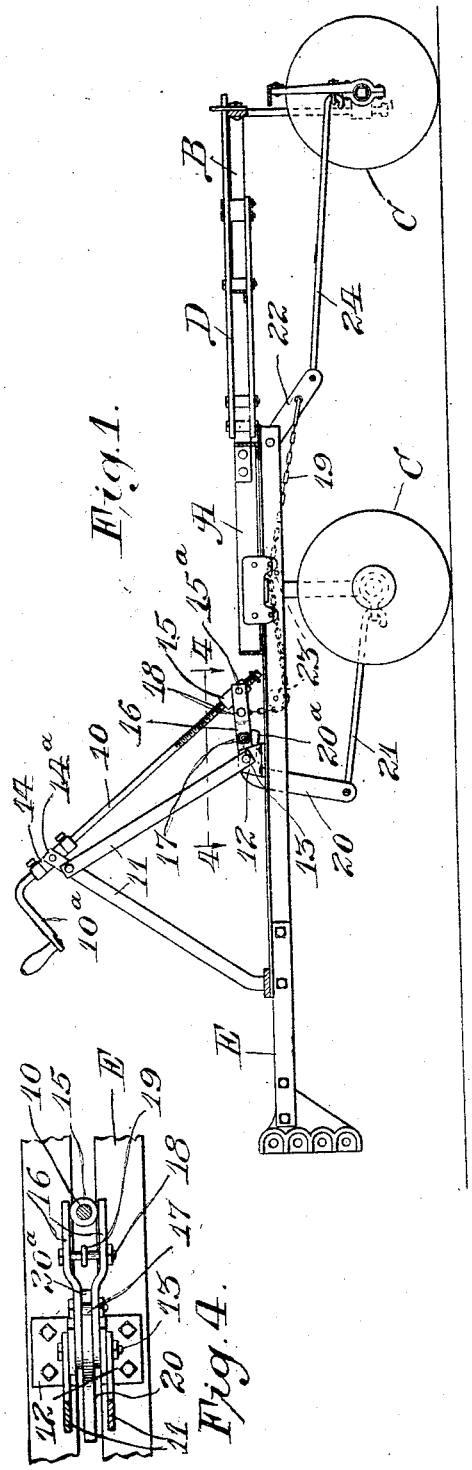
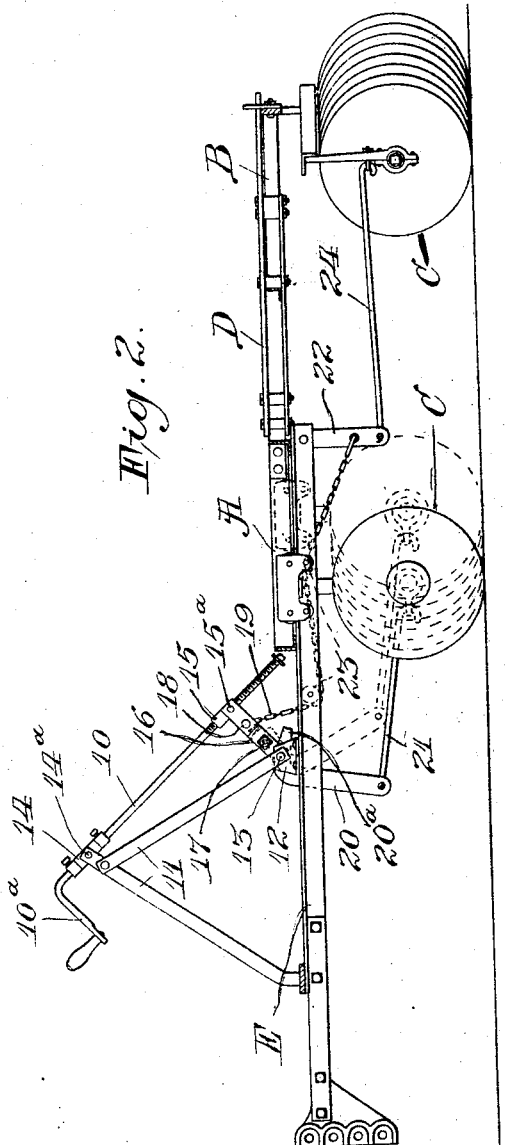
Inventor.
Sherman W. Cady,
By N.P. Daniels
Atty.

June 23, 1925.
S. W. CADY
TRACTOR HARROW
1,543,639
Filed March 1, 1922
2 Sheets-Sheet 2
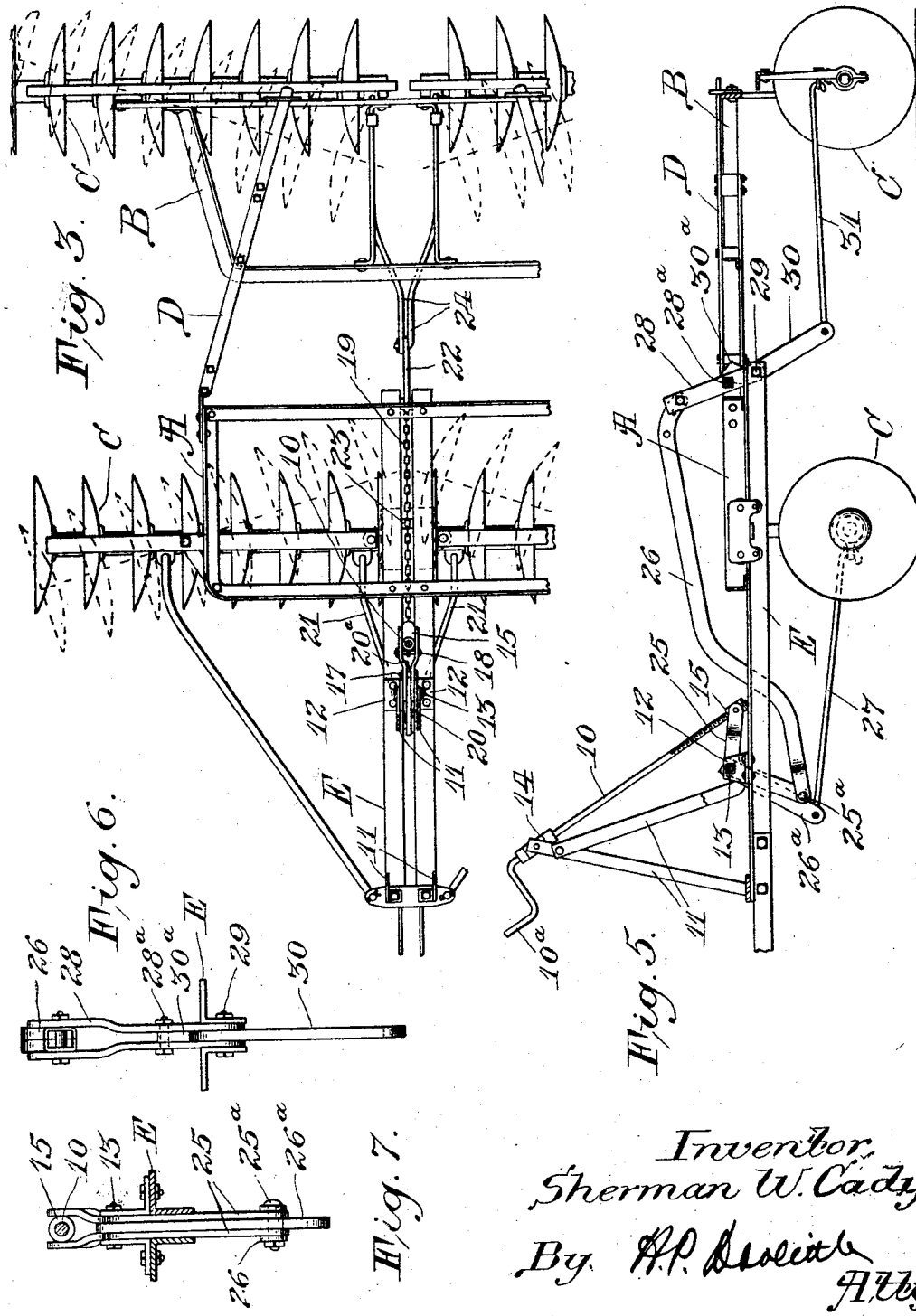
Inventor,
Sherman W. Cady,
By
Atty.

Patented June 23, 1925.

1,543,639

UNITED STATES PATENT OFFICE.

SHERMAN W. CADY, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

TRACTOR HARROW.

Application filed March 1, 1922. Serial No. 540,191.

*To all whom it may concern:*

Be it known that I, SHERMAN W. CADY, a citizen of the United States, residing at Hamilton, in the county of Wentworth and Province of Ontario, Canada, have invented certain new and useful Improvements in Tractor Harrows, of which the following is a full, clear, and exact specification.

My invention relates to gang adjusting mechanism for tractor disk harrows, and the objects of the invention are to provide double or tandem harrows with gang adjusting mechanism of simple construction that can be conveniently controlled by the operator of the tractor which is drawing the harrow, and that will cause the disk gangs to be angled for work or straightened for transport with the minimum of exertion on the part of the operator, and principally by making use of the draft power of the tractor.

I accomplish these objects by providing the front section of the disk harrow with a manually operated device of novel type comprising a movable member shiftable back and forth on the frame of the harrow by means of a screw shaft having a conveniently located crank, and connecting the shiftable member to each of the gangs by lost motion couplings of special construction in such a way that but one of the pairs of gangs is positively acted on by the angling mechanism when manually operated, the tractive power causing the other pair to automatically assume the position given the pair acted upon by the angling mechanism, thus requiring use of only about half the force needed for controlling prior devices of this type where both pairs are positively shifted by manually operated adjustable devices. At the same time, my construction permits both of the gangs to straighten automatically when the harrow is backed, as found desirable in practice, and when so straightened, the manual device can be operated, free of all load, to set or determine the angle the gangs shall have in relation to the frame when the harrow again moves forwardly, as will be more fully explained hereafter.

With the foregoing objects in view, my invention consists in the organization and details of construction described in the following specification and more particularly defined in the claims.

Having reference to the drawings—

Figure 1 is a side elevation of a tandem harrow embodying my invention;

Fig. 2 is a similar view with the gangs in working position;

Fig. 3 is a partial plan view of the harrow;

Fig. 4 is a detail sectional view on the line 4—4 of Fig. 1;

Fig. 5 is a side elevation showing a modified form of my invention;

Fig. 6 is a detail elevation of the rear levers shown in Fig. 5 viewed from the rear; and Fig. 7 is a detail elevation of the front levers viewed from the front.

I have chosen to illustrate my invention in combination with a tractor harrow having essentially the same frame construction and organization as is disclosed in the patent to Sharp, No. 1,322,066, Nov. 18, 1919, the principal parts of which are a front frame A and a rear frame B, each equipped with the usual pair of disk gangs C. The front and rear sections or frames are connected by members D, which are telescopically connected to the rear frame, and the front section has the forwardly projecting angle members forming the draft frame or tongue E.

The controlling mechanism comprised in my invention consists of a screw shaft 10 supported on the draft frame E of the harrow by means of upwardly converging standards 11, which preferably comprise four bars—two front and two rear—secured to the draft frame and secured to each other at their upper ends, the lower ends of the rear bars being secured to spaced brackets 12 on the tongue members by means of a transverse bolt 13, Fig. 4. On the upper end of the standards 11 there is mounted a sleeve 14 by means of trunnions 14$^a$, and in this sleeve there is journaled the upper end of the screw shaft 10 on which there is formed the operating crank 10$^a$. The lower end of the screw shaft is threaded and is in engagement with a sleeve 15, which has trunnions 15$^a$ pivoted between the arms of a forked or twin-bar lever 16 which is pivoted on the bolt 13 between the brackets 12 and the two bars of which are secured in proper spaced relation by a bolt and spacing sleeve 17 positioned in proximity to its pivot. A second bolt 18 connects the two parts of the lever 16 intermediate the bolt 17 and the sleeve 15, and to this bolt there is adjustably secured one end of a flexible element such as the chain 19. The bolt 13 also serves as support for the upper end of a pendent lever 20, which has an angular extension 20ª at its upper end projecting in a direction to engage beneath the bolt 17 on lever 16 in certain positions of the two levers forming an elbow joint between them. The lower end of lever 20 receives one end of links 21 connecting with the inner ends of the disk gangs on the front section of the harrow. On the rear end of the tongue members E there is pivoted a pendent member or lever 22 to which the other end of the flexible element 19 is connected in the manner shown in Figs. 1 and 2. The member 19 is preferably guided on rollers 23 mounted between the angle bars forming the draft tongue E, as shown in dotted lines in Figs. 1 and 2. The lever 22 at its lower end is connected by means of links 24 with the inner ends of the gangs on the rear harrow section in the manner best shown in Fig. 3.

In Fig. 5 I have illustrated a modified form of the invention in which the standards 11, screw shaft 10, sleeve 14 and screw sleeve 15 are substantially the same as in the construction first described. In lieu of lever 16, however, there is employed an angular lever 25, one end of which is connected to screw sleeve 15 and the lower end of which is pivoted to a connecting bar 26 which is a substitute for the chain 19 of my other species. The lever 25 is formed of two spaced bars, as seen in Fig. 7, connected at their lower ends by a bolt 25ª, and a pendent lever 26ª pivoted on bolt 13 is positioned just ahead of the lower end of lever 25 in a manner to engage bolt 25ª in certain positions of the levers. The lower end of lever 26ª connects with the inner ends of the front gangs by means of links 27. Bar 26 passes between the angle members forming tongue E, and extends above the front harrow frame and has its rear end pivotally connected between the arms of a twin-bar lever 28 which has its lower end pivoted on a bolt 29 between the rear end of the tongue members. A spacing bolt 28ª connects the members of the lever 28 intermediate their ends. Also pivoted on bolt 29 is a pendent lever 30 which has an angular extension 30ª projecting rearwardly in position to engage bolt 28ª in certain positions of the two levers. The lower end of lever 30 is connected to the inner ends of the rear gangs by means of links 31. It will be noted that in both modifications the angling connections to the respective pairs of gangs are largely independent, and the strain on one pair of gangs while working is not communicated, through angling connections, to the other as in some prior devices.

In operating the angling mechanism constructed as shown in Figs. 1 and 2, the operator, desiring to put the gangs into working angle without stopping the tractor, rotates shaft 10 in the direction to move sleeve 15 upwardly thereon from the position illustrated in Fig. 1 to that illustrated in Fig. 2. This will cause lever 16 to swing forwardly and at the same time pull up chain 19, swinging lever 22 forwardly and causing links 24 to draw the inner ends of the rear gangs forwardly into angled or working position, as in Fig. 2. Lever 16 is free to move forwardly independently of lever 20, but the travel of the harrow will cause the inner ends of the front gangs to move rearwardly and the lever 20 to move in a similar direction keeping its angular extension 20ª in contact with the bolt 17 on lever 16, and both pairs of gangs will assume similar angled position, the movement of lever 20 during travel of the harrow being from full line to dotted line position illustrated in Fig. 2. When it is desired to straighten the gangs from position shown in Fig. 2 the screw shaft is rotated in the direction to cause sleeve 15 to travel downwardly thereon, and as bolt 17 is then in contact with the angular ends of lever 20, the lower end of this lever will be swung forwardly and the front gangs will be positively forced into straightened position. At the same time the chain 19 will be slackened without any direct effect on the rear gangs, and these will straighten by effect of the forward travel of the harrow.

The operation of the modification shown in Fig. 5 is essentially the same. With that construction rotation of screw shaft 10 in a manner to cause the sleeve 15 to travel upwardly from the position shown in said figure will cause lever 25 to swing in a manner to move bar 26 rearwardly, thereby swinging levers 28 and 30 jointly because of the contact bolt 28ª with the extension 30ª, thereby positively angling the rear disk gangs. This operation will not have affected lever 26ª and the front gangs will fall into angle as the harrow travels forwardly, the resistance of the soil causing their inner ends to swing rearwardly and lever 26ª to swing backwardly keeping it in contact with bolt 25ª on the lower end of lever 25. On reverse movement of sleeve 15 to straighten the gangs, it will be evident that levers 25 and 26ª will be swung together, thus positively straightening the front gangs, and that bar 26 will move lever 28 forwardly without affecting lever 30 and the rear gangs will swing into straightened position by travel of the harrow and be stopped by contact of extension 30ª with bolt 28ª.

It will also be evident that with either modification of my invention, all the gangs will straighten if the harrow is backed while they are in working or angled position. In the first described modification this is made possible by the fact that lever 20 is free to swing forwardly thus permitting the resistance of the soil on the disks to swing the gangs to straightened position when the harrow is backed, straightening of the rear gangs being made possible by the telescopic relation of the frames. In the modification of Fig. 5 the lever 26ª is free to swing in a forward direction when the harrow is backed, and the telescopic relation of the frames will, as in the first instance, cause the rear gangs to straighten also as the motion of the front frame toward the rear frame will permit the inner ends of the rear gangs to move backwardly towards straightened position.

This combination of the gang controlling device with a harrow having telescopically connected sections makes it possible to angle and straighten the gangs wholly by draft power in the following manner: Assuming that the gangs are straight and the operator wishes to put them at angle, he simply backs the tractor and harrow until the draw bars or connecting members D have telescoped in the rear frame, this will cause chain 19 of Fig. 1 to become slack or lever 30 in Fig. 5 to swing forwardly, he then turns the screw shaft 10, (which under these conditions is under no load as chain 19 is slack and lever 20 does not move) until he has set the angle desired as measured by the extent to which sleeve 15 and lever 16, or sleeve 15 and lever 25 in the case of Fig. 5, have travelled upwardly on the screw. As this operation has taken up more or less of the slack in chain 19 and moved stop 17 away from the projection 20ª, forward movement of the tractor and harrow will cause the front and rear gangs to fall into the angle set. If, on the contrary, the gangs were at angle and the operator has straightened them by backing the tractor and harrow and he wishes them to remain straight when he next moves forward, he simply turns shaft 10 in a direction to move sleeve 15 downwardly on the screw to the full extent of its travel and the gangs will then be held in straight position on forward movement of the harrow.

The above description will make it evident that I have devised a simple and efficient angle controlling mechanism readily accessible to the operator on the seat of the tractor pulling the harrow, and one which can be easily manipulated as, even when the tractor power is not employed for angling, only one pair of gangs is positively acted upon by the angling mechanism both in angling and straightening the gangs, the rear gangs only being positively acted upon when angling by hand, and the front gangs only being positively acted upon when straightening. In either case the angle for the other pair of gangs is set by the angling mechanism, and this angle is assumed through tractive force upon forward travel of the harrow. If backing of the harrow is employed as above described, the control device operates merely to set the angle of the gangs desired.

While I have disclosed my invention in combination with a tandem disk harrow having sliding or telescopic draft connections between the sections, it is of course evident that my invention is not restricted to that specific type of harrow.

I claim as my invention:

1. The combination with a disk harrow having front and rear sections and an angularly adjustable disk gang on each section, of means for adjusting the gangs comprising a lever pivoted on the front section, means for shifting the lever, a connection between the lever and one gang including a second lever having an elbow joint connection with said first lever, and a connection between the lever and the other gang including a flexible element.

2. The combination with a disk harrow having front and rear sections and an angularly adjustable disk gang on each section, of means for adjusting the gangs comprising two cooperating independently shiftable members mounted on the front section for movement in the same plane and having means causing them to become interlocked after a predetermined movement of either member, a manually operable actuating rod connected to one of said members, and a connection between each one of the members and one of the gangs.

3. The combination with a disk harrow having front and rear sections and an angularly adjustable disk gang on each section, of means for adjusting the gangs comprising a lever pivoted on the front section, means for shifting the lever, a connection between said lever and the front gang, a second lever pivoted on the front frame behind said first mentioned lever, a flexible element connecting said levers, and a connection between said second lever and the rear gang.

4. The combination with a disk harrow having front and rear sections and an angularly adjustable disk gang on each section, of means for adjusting the gangs comprising a shiftable member on the front section, a forwardly directed operating shaft journaled on the front section and having threaded engagement with said member, and a connection between said member and each of the gangs each of which includes a lost motion coupling effective in one direction of movement.

5. The combination with a disk harrow comprising a frame and an angularly adjustable disk gang, of means for adjusting the gang comprising a pivoted member mounted on the frame and a forwardly extending operating shaft journaled on the frame and having threaded connection with said member, and a connection between said member and gang including a flexible element.

6. The combination with a disk harrow comprising front and rear sections, an angularly adjustable disk gang on each section, and connecting means between the sections that permit limited movement of the sections bodily towards and from each other; of angle controlling mechanism for the gangs comprising a shiftable member on one section, connections between said member and each gang, and lost motion couplings, in each of said connections which release the shiftable member from the gangs when the sections are made to approach each other.

7. The combination with a disk harrow comprising front and rear sections, an angularly adjustable disk gang on each section, and connecting means between the sections that permit limited movement of the sections bodily towards and from each other; of angle controlling mechanism for the gangs comprising a shiftable member on the front section, a connection between said member and the front gang including a lost motion coupling permitting the front gang to straighten when the harrow is backed, and a second connection between said member and the rear gang including a flexible element permitting the front section to approach the rear when the harrow is backed.

8. The combination with a disk harrow comprising a frame and front and rear angularly adjustable disk gangs thereon, of means for adjusting the angle of the gangs comprising a pair of cooperating levers pivoted on the frame, a stop on one lever adapted to be engaged by the other when the levers are in a certain position but permitting either lever to swing independently in one direction, and operating connections between the respective levers and gangs.

9. The combination with a disk harrow comprising a frame and front and rear angularly adjustable disk gangs thereon, of means for adjusting the angle of the gangs comprising a lever pivoted to swing above the frame, a second lever pivoted at the same point and swinging below the frame, an extension on one lever adapted to be engaged by the other when the levers are in a certain position but permitting either lever to swing forwardly independently of the other, and operating connections between the respective levers and gangs.

In testimony whereof I affix my signature.

SHERMAN W. CADY.

Witnesses:
 JOHN S. NICHOLSON,
 PEARL NICHOLSON.